(12) United States Patent
Chen et al.

(10) Patent No.: US 11,829,350 B2
(45) Date of Patent: Nov. 28, 2023

(54) DETECTION OF ABNORMAL TRANSACTION LOOPS

(71) Applicant: HEWLETT PACKARD ENTERPRISE DEVELOPMENT LP, Houston, TX (US)

(72) Inventors: Rotem Chen, Yehud (IL); Hava Babay Adi, Yehud (IL); Yifat Felder, Yehud (IL); Ran Biron, Sunnyvale, CA (US)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 15/319,338

(22) PCT Filed: Jul. 28, 2014

(86) PCT No.: PCT/US2014/048397
§ 371 (c)(1),
(2) Date: Dec. 15, 2016

(87) PCT Pub. No.: WO2016/018210
PCT Pub. Date: Feb. 4, 2016

(65) Prior Publication Data
US 2017/0154071 A1 Jun. 1, 2017

(51) Int. Cl.
*G06F 16/23* (2019.01)
*G06F 16/22* (2019.01)
(Continued)

(52) U.S. Cl.
CPC .......... *G06F 16/2379* (2019.01); *G06F 11/00* (2013.01); *G06F 11/08* (2013.01);
(Continued)

(58) Field of Classification Search
CPC ............ G06F 16/2379; G06F 16/2246; G06F 16/2365; G06F 11/00; G06F 11/08; G06F 11/34
See application file for complete search history.

(56) References Cited

U.S. PATENT DOCUMENTS 5,974,407 A * 10/1999 Sacks ................... G06F 16/284
7,526,468 B2    4/2009 Vincent et al.
(Continued)

OTHER PUBLICATIONS

Shin et al., "Automatic generation of transaction level models for rapid design space exploration", CODES+ISSS '06: Proceedings of the 4th international conference on Hardware/software codesign and system synthesis, Oct. 2006 pp. 64-69 (Year: 2006).*
(Continued)

*Primary Examiner* — Mark D Featherstone
*Assistant Examiner* — Kweku William Halm
(74) *Attorney, Agent, or Firm* — Sheridan Ross P.C.

(57) ABSTRACT

Examples relate to detecting an abnormality. The examples disclosed herein enable receiving, from a first user, a first request to perform a first transaction on at least one data record. A plurality of transactions originated from the first request may be organized in a first hierarchical tree-based data structure having multiple depth levels. The data structure may comprise a root node representing the first transaction and a leaf node representing a second transaction. The examples further enable detecting the abnormality based on at least one parameter where the at least one parameter comprises a size of the data structure and a depth level associated with the leaf node.

20 Claims, 7 Drawing Sheets

(51) Int. Cl.
*G06F 11/08* (2006.01)
*G06F 17/00* (2019.01)
*G06F 11/34* (2006.01)
*G06F 11/00* (2006.01)

(52) U.S. Cl.
CPC .......... *G06F 11/34* (2013.01); *G06F 16/2246* (2019.01); *G06F 16/2365* (2019.01); *G06F 17/00* (2013.01)

(56) References Cited

U.S. PATENT DOCUMENTS

| | | | | |
|---|---|---|---|---|
| 7,725,572 | B1* | 5/2010 | Kautzleben | H04L 43/00 709/224 |
| 8,146,099 | B2 | 3/2012 | Tkatch et al. | |
| 8,161,058 | B2 | 4/2012 | Agarwal et al. | |
| 8,543,683 | B2 | 9/2013 | Kiciman et al. | |
| 8,812,434 | B2* | 8/2014 | Gagliardi | G06F 11/3495 707/602 |
| 8,855,926 | B1* | 10/2014 | Murphy | H04W 4/02 701/400 |
| 10,009,246 | B1* | 6/2018 | Benattar | G06Q 30/0201 |
| 2003/0065986 | A1* | 4/2003 | Fraenkel | H04L 41/046 714/47.2 |
| 2004/0243349 | A1* | 12/2004 | Greifeneder | H04L 63/0428 702/183 |
| 2005/0038772 | A1* | 2/2005 | Colrain | G06F 9/5061 |
| 2005/0097128 | A1 | 5/2005 | Ryan et al. | |
| 2005/0240624 | A1* | 10/2005 | Ge | G06F 17/30935 |
| 2006/0126517 | A1* | 6/2006 | Kurosaki | H04L 45/18 370/229 |
| 2006/0155753 | A1 | 7/2006 | Asher et al. | |
| 2006/0168199 | A1* | 7/2006 | Chagoly | G06Q 10/10 709/224 |
| 2007/0074189 | A1* | 3/2007 | Srinivas | G06F 11/3612 717/144 |
| 2007/0263541 | A1* | 11/2007 | Cobb | H04L 43/00 370/235 |
| 2008/0177698 | A1* | 7/2008 | Agarwal | G06F 11/008 |
| 2009/0077013 | A1* | 3/2009 | Hu | G06F 17/30306 |
| 2009/0222822 | A1 | 9/2009 | Riemers | |
| 2010/0218049 | A1 | 8/2010 | Mostow | |
| 2010/0281013 | A1 | 11/2010 | Graefe | |
| 2011/0246503 | A1 | 10/2011 | Bender et al. | |
| 2012/0047181 | A1* | 2/2012 | Baudel | G06F 16/2246 707/E17.012 |
| 2012/0260133 | A1* | 10/2012 | Beck | G06F 11/323 714/38.1 |
| 2012/0278293 | A1 | 11/2012 | Bulkowski et al. | |
| 2013/0018898 | A1* | 1/2013 | Forstmann | G06F 16/90335 707/E17.014 |
| 2013/0046779 | A1* | 2/2013 | Gagliardi | G06F 11/3612 707/769 |
| 2013/0275816 | A1* | 10/2013 | Bernstein | G06F 11/0754 714/48 |
| 2014/0068348 | A1* | 3/2014 | Mondal | G06F 11/079 714/45 |
| 2014/0101591 | A1* | 4/2014 | Helfman | G06F 3/0484 715/771 |
| 2015/0324484 | A1* | 11/2015 | Tsirkin | G06F 16/9027 707/693 |
| 2015/0363465 | A1* | 12/2015 | Bordawekar | G06F 16/9027 707/718 |

OTHER PUBLICATIONS

International Search Report & Written Opinion received in PCT Application No. PCT/US2014/048397, dated Feb. 25, 2015, 9 pages.

Moawad, A. et al., "A Rule-based Contextual Reasoning Platform for Ambient Intelligence Environments," (Research Paper), Feb. 28, 2013, 15 pages, available at http://www.academia.edu/6761710/A_Rule-based_Contextual_Reasoning_Platform_for_Ambient_Intelligence_environments.

* cited by examiner

DETECTION OF ABNORMAL TRANSACTION LOOPS

BACKGROUND

When a large number of transactions are executed in a computing system, it is important that any performance degrading factors are quickly identified and addressed. Performance degradation, for example, could affect the ability to adequately support and handle requests from various users. One of the major challenges for system administrators is, therefore, to quickly identify when a performance issue occurs and pinpoint the potential root cause of the performance degradation so that the issue can be resolved in a timely manner. Such approach can be very labor intensive, requiring the administrators to continuously monitor the computing system until a performance degradation issue is found and manually analyze the issue to identify the potential root cause.

BRIEF DESCRIPTION OF THE DRAWINGS

The following detailed description references the drawings, wherein.

DETAILED DESCRIPTION

Figure 1:
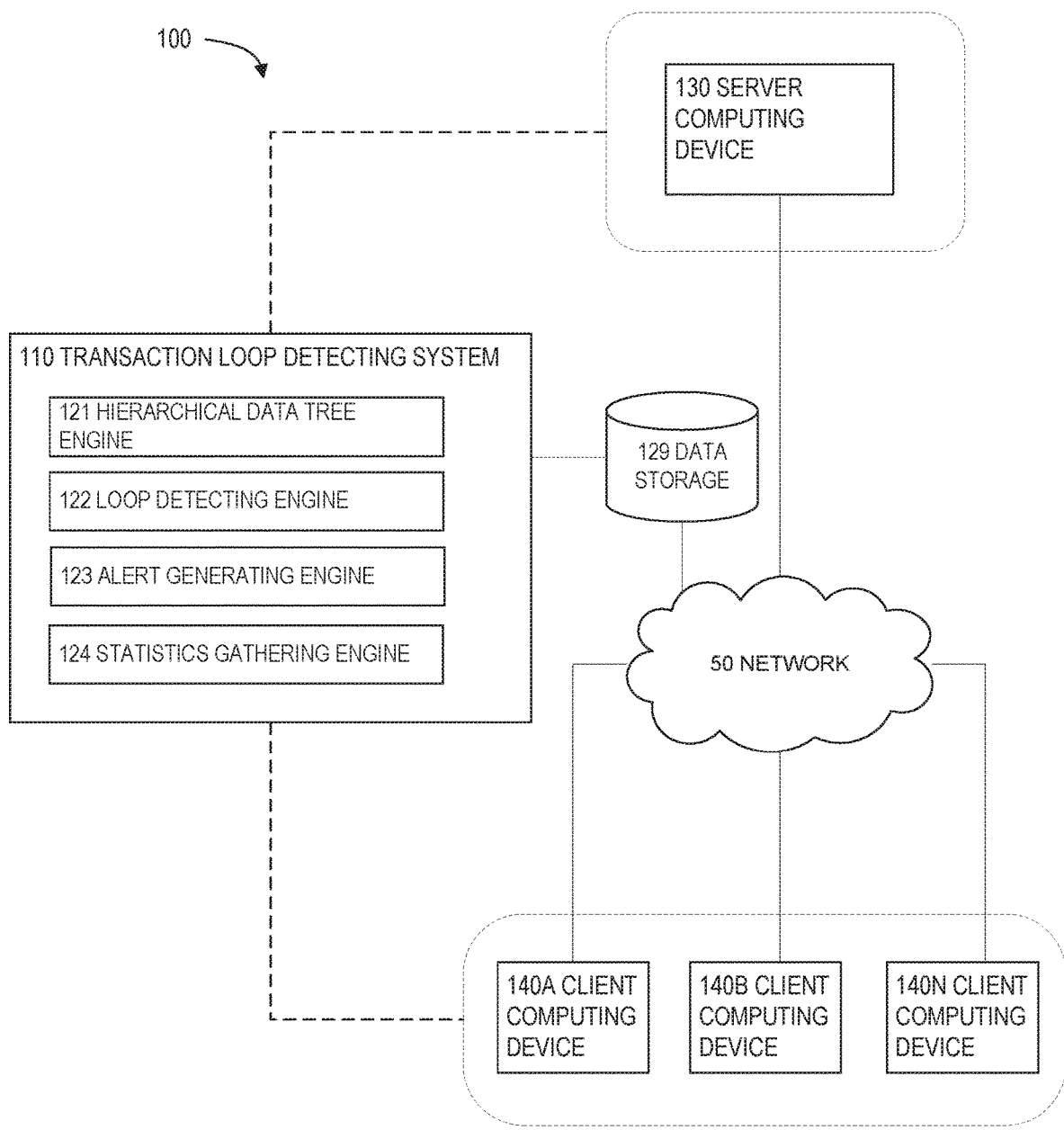
FIG. 1 is a block diagram depicting an example environment in which various examples may be implemented as a transaction loop detecting system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

When a large number of transactions are executed in a computing system, it is important that any performance degrading factors are quickly identified and addressed. System administrators are, therefore, responsible for quickly identifying when a performance issue occurs and pinpointing the potential root cause of the performance degradation so that the issue can be resolved in a timely manner. Such approach can be very labor intensive, requiring the administrators to continuously monitor the computing system until a performance degradation issue is found and manually analyze the issue to identify the potential root cause.

In some instances, performance degradation can occur when multiple database transactions create a long chain of transactions or even a potentially infinite or endless loop of transactions. A transaction may begin and/or initiate when a user makes a request to perform and/or execute the transaction on at least one data record and/or data entity. Such a transaction may comprise at least one of "insert," "update," and/or "delete" database operations on at least one data record and/or entity. From the time the transaction is begun until it is successfully committed or rolled back, the operations defined in the particular transaction may be made against the database and will either all succeed or all fail. In some instances, the performance of the transaction (and various operations defined in the transaction) on a particular data record may require additional transactions to be performed on other data records that are related to the particular data record, causing a potentially infinite or endless loop of transactions.

For example, each data entity may be associated with a particular entity type. Each entity type may be associated with a predefined workflow lifecycle. The predefined workflow lifecycle for each entity type may comprise a plurality of states where in each state, there is a predefined business logic that should be applied to the entities in that state. Using this example, when a user makes a request to update a data entity that belongs to a particular entity type, the predefined workflow lifecycle associated with that entity type may be identified. From the predefined workflow lifecycle, appropriate business logic may be retrieved based on a particular state of that data entity and applied to the entity. In some instances, the business logic defined in the workflow lifecycle may require additional transactions to be initiated on the data entities that are related to the original data entity. Some of these additional transactions may also initiate another set of transactions to be performed on other related entities, causing a potentially infinite or endless loop of transactions.

Examples disclosed herein address these issues by automatically detecting an abnormality that may potentially cause an infinite or endless loop of transactions using a hierarchical transaction tree. A plurality of transactions originated from a single request may be organized in the hierarchical transaction tree. The abnormality may be detected based on a size of the tree and/or a depth level of a leaf node representing the latest transaction added to the tree. Upon the detection of the abnormality, an alert including root cause information may be generated and/or stored in a data storage. Moreover, statistics may be gathered on the size of various transaction trees and/or depth levels associated with their nodes. The statistics may be analyzed to determine a recommended threshold that may be used during the detection.

FIG. 1 is an example environment 100 in which various examples may be implemented as a transaction loop detecting system 110. Environment 100 may include various components including server computing device 130 and client computing devices 140 (illustrated as 140A, 140B, ..., 140N). Each client computing device 140A, 140B, . . . , 140N may communicate requests to and/or receive responses from server computing device 130. Server computing device 130 may receive and/or respond to requests from client computing devices 140. Client computing devices 140 may include any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, transaction loop detecting system 110 and the various components described herein may be implemented in hardware and/or programming that configures hardware. Furthermore, in FIG. 1 and other Figures described herein, different numbers of components or entities than depicted may be used.

Transaction loop detecting system 110 may generate a hierarchical data tree (also referred herein as "hierarchical tree-based data structure," "transaction tree, "hierarchical data structure," and the like) based on a request to perform a transaction on at least one data entity and/or record. The hierarchical data tree may organize a plurality of transactions originated from the request in a tree-based data structure having multiple depth levels. For each new transaction added to the hierarchical tree, transaction loop detection system 110 may determine whether an abnormality (also referred herein as "abnormal transaction loop" and the like) that may create a potentially infinite or endless loop of transactions is detected. The abnormality may be detected based on at least one parameter comprising a size of the hierarchical data tree and/or a depth level associated with the leaf node corresponding to the new transaction. Transaction loop detecting system 110 may generate a notification (also referred herein as "alert" and the like) based on the detected abnormality. The notification may comprise information about a potential root cause of the performance degradation experienced by the computing system.

Transaction loop detecting system 110 may gather and/or collect statistics on at least one of the size of a plurality of hierarchical data trees and the depth level of leaf nodes in the plurality of hierarchical data trees. Moreover, transaction loop detecting system 110 may analyze the statistics to determine a recommended threshold to be used during the detection.

To facilitate these and other functions, transaction loop detecting system 110 may comprise a hierarchical data tree engine 121, a loop detecting engine 122, an alert generating engine 123, a statistics gathering engine 124, and/or other engines. The term "engine", as used herein, refers to a combination of hardware and programming that performs a designated function. As is illustrated respect to FIG. 2, the hardware of each engine, for example, may include one or both of a processor and a machine-readable storage medium, while the programming is instructions or code stored on the machine-readable storage medium and executable by the processor to perform the designated function.

Figure 7:
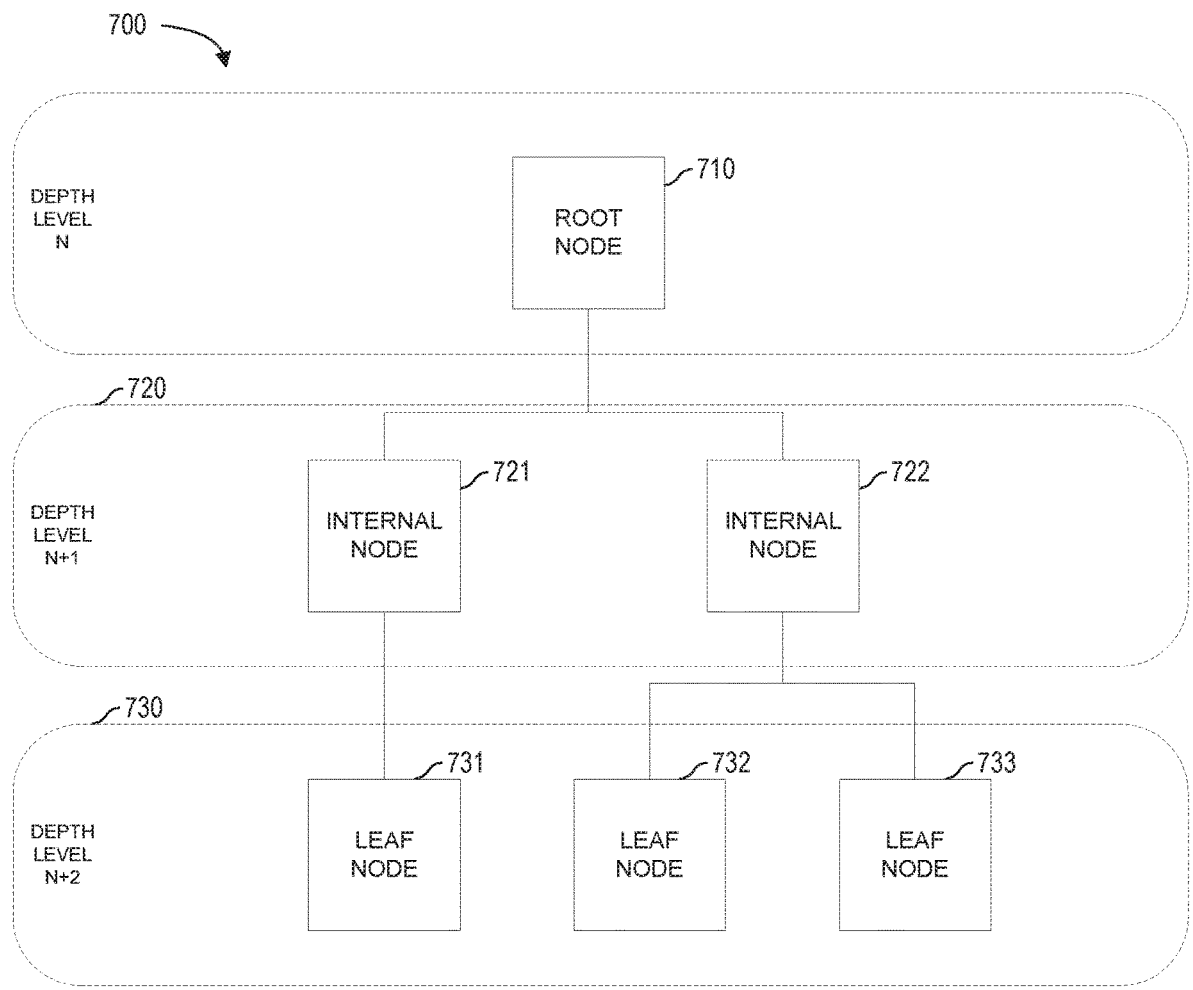
FIG. 7 is a diagram depicting an example hierarchical data tree for organizing a plurality of transactions originated from a request to perform a root transaction.

Hierarchical data tree engine 121 may generate a hierarchical data tree based on a request to perform a transaction on at least one data entity and/or record. The hierarchical data tree may organize a plurality of transactions originated from the request in a tree-based data structure having multiple depth levels. The hierarchical data tree may comprise a root node, an internal node, and/or a leaf node. The root node is the top-most node from which the tree starts. The internal node indicates that the node has sub-nodes (e.g., children nodes). The leaf node refers to a node with no sub-nodes. Each node in the tree may represent a data structure comprising a corresponding transaction. An example hierarchical data tree is illustrated in FIG. 7.

The plurality of transactions originated from the same request may belong to the same data tree. As such, the plurality of transactions in the same data tree may be associated with the same identifier or identifying information. The identifier may uniquely identify the request. For example, each transaction which originated from the same request may be associated with a particular transaction context identification (ID) such that all of the transactions in the same transaction tree will share the same transaction context ID. The identifiers for different transaction trees may be stored in a centralized data storage (e.g., data storage 129) that may be accessible by a plurality of server computing devices. The centralized data storage may comprise a cache memory. In this way, the related transactions that have been triggered based on the same request can be linked together even when the transactions are being processed on different server computing devices (e.g., in a distributed computing environment).

A first or initial transaction to be initiated based on the request may be referred to herein as the "root" transaction. The root transaction either directly or indirectly calls all other transactions in the tree. The root transaction may be stored as a root node in the hierarchical data tree. Hierarchical data tree engine 121 may determine whether the performance of the root transaction that has been performed on a first data entity requires another transaction to be performed on another data entity that is related to or affected by the first data entity. In response to determining that the performance of the first transaction requires a second transaction to be performed on a second data entity related to the first data entity, hierarchical data tree engine 121 may store the second transaction as a second node in the hierarchical data tree. The second node may be placed below the root node and therefore have a depth level that is deeper than the depth level of the first node. For example, the root node may be associated with the depth level "N" where the second node which sits below the root node may be associated with the depth level "N+1."

The root transaction may call more than one transaction to be performed on its related entities. For example, there may be several nodes at the depth level "N+1" of the hierarchical tree. For each of the plurality of nodes at the depth level "N+1," hierarchical data tree engine 121 may determine whether the performance of the transaction corresponding to that particular node requires any additional transactions to be performed on its related entities. In response to determining that the performance of the second transaction, for example, would require a third transaction to be performed on a third data entity related to the second data entity, hierarchical data tree engine 121 may store the third transaction as a third node in the hierarchical data tree. The third node may be placed below the second node and therefore have a depth level that is deeper than the depth level of the second node. For example, the third node may be associated with the depth level "N+2." As such, hierarchical data tree engine 121 may determine whether any additional transactions are required based on the previous transaction and, if so, store the additional transactions as children nodes of the previous node in the tree. Over time, the size (e.g., a number of nodes in the tree) and/or the depth of the tree may continuously grow until loop detecting engine 122 may determine that an abnormality and/or abnormal transaction loop has been detected. Loop detection engine 112 is discussed in detail below.

For each new transaction added to the hierarchical tree, loop detection engine 112 may determine whether an abnormality that may create a potentially infinite or endless loop of transactions is detected. The abnormality may be detected based on at least one parameter comprising a size of the hierarchical data tree and/or a depth level associated with the leaf node corresponding to the new transaction. The size of the tree may indicate a number of nodes in the tree. For example, if an initial transaction directly or indirectly calls 9 additional transactions based on a single request, the hierarchical tree corresponding to that request may comprise 10 nodes. In this example, the size of the tree may be 10. In some instances, the size of the tree may include the number of internal nodes and leaf nodes, excluding the root node. In that case, the size may equal to 9 using the example above. The size information related to a particular hierarchical tree may be tracked and/or stored in data storage 129 (e.g., centralized data storage as discussed above) so that it can be easily accessible by multiple server computing devices.

Loop detection engine 112 may detect the abnormal transaction loop by comparing the information related to the hierarchical data tree (e.g., the tree size and/or the depth level of the leaf node corresponding to the new transaction) against a predetermined threshold. For example, the tree size information may be compared against a predetermined size threshold. On the other hand, the depth level information may be compared against a predetermined depth threshold. In some implementations, different levels of thresholds may be specified. For example, when a first predetermined threshold (e.g., warning threshold) is violated, alert generating engine 123 may take a first set of actions whereas when a second predetermined threshold (e.g., error threshold) is violated, a second set of actions may be taken. Alert generating engine 123 is discussed in detail below.

Alert generating engine 123 may generate a notification based on the comparison against a predetermined threshold. The notification may comprise information about a potential root cause of the performance degradation experienced by the computing system. The root cause information may include information related to the root transaction and/or the original request to perform the root transaction. For example, the root cause information may indicate when the request/transaction was made, which database operations have been made by the request/transaction, which data record(s) have been affected by the request/transaction, etc. The root cause information generated in this way may be stored and/or logged in data storage 129 (e.g., centralized data storage as discussed above) for future use. For example, a system administrator may examine the root cause information to quickly identify the reason for the performance degradation and take a corrective action. In some implementations, alert generating engine 123 may cause the performance and/or execution of the new (or latest) transaction to be ceased, stopped, and/or rolled back based on the notification.

Alert generating engine 123 may generate the notification when a predetermined size threshold is violated (e.g., the tree size being equal to or exceeding the size threshold) or when a predetermined depth threshold is violated (e.g., the depth level of the leaf node corresponding to the new transaction being equal to or exceeding the depth threshold). In some implementations, the notification may be generated when both the size and the depth thresholds are violated.

As discussed above, in some implementations, different levels of thresholds may be specified. For example, when a first predetermined threshold (e.g., warning threshold) is violated, a first notification may be generated and/or stored in data storage 129 (e.g., centralized data storage as discussed above). When a second predetermined threshold (e.g., error threshold) is violated, a second notification may be generated and/or stored in data storage 129. Moreover, alert generating engine 123 may cause the performance and/or execution of the new (or latest) transaction to be ceased, stopped and/or rolled back based on the second notification. For example, a size threshold may comprise a first size threshold and a second size threshold. If the size of the data tree exceeds the first size threshold, a warning notification may be generated and/or stored. However, when the second size threshold is violated, an error notification may be generated and/or stored. In response to the error notification, the performance of the new (or latest) transaction may be ceased. Similarly, a depth threshold may also include a first depth threshold and a second depth threshold. Although only two different levels of thresholds are discussed above, additional levels of thresholds (and corresponding actions when violated) may be specified as well.

Statistics gathering engine 124 may gather and/or collect statistics on at least one of the size of a plurality of hierarchical data trees and the depth level of leaf nodes in the plurality of hierarchical data trees. In one example, the statistics may be gathered on the average size of data trees. In this example, when there are 10 different data trees built based on 10 different requests, statistics gathering engine 124 may track the average size of those 10 data trees. In another example, statistics gathering engine 124 may track the depth level of the deepest leaf node of individual data trees. In some instances, the average depth level may be calculated and/or stored. In some implementations, statistics gathering engine 124 may determine a recommended threshold (e.g., a predetermined size threshold, a predetermined depth threshold, etc.) based on the statistics. The recommended size or depth threshold may be compared to the size or depth information of a particular data tree to detect an abnormal transaction loop.

In performing their respective functions, engines 121-124 may access data storage 129. Data storage 129 may represent any memory accessible to transaction loop detecting system 110 that can be used to store and retrieve data. Data storage 129 may comprise random access memory (RAM), read-only memory (ROM), electrically-erasable programmable read-only memory (EEPROM), cache memory, floppy disks, hard disks; optical disks, tapes; solid state drives; flash drives, portable compact disks, and/or other storage media for storing computer-executable instructions and/or data. Transaction loop detecting system 110 may access data storage 129 locally or remotely via network 50 or other networks. In some implementations, data storage 129 may be a centralized data storage that may be accessible by a plurality of server computing devices in a distributed computing environment. The centralized data storage may, in some instances, comprise cache memory.

Data storage 129 may include a database to organize and store data. Database may be; include, or interface to, for example, an Oracle™ relational database sold commercially by Oracle Corporation. Other databases, such as Informix™, DB2 (Database 2) or other data storage, including file-based (e.g., comma or tab separated files), or query formats, platforms, or resources such as OLAP (On Line Analytical Processing), SQL (Structured Query Language), a SAN (storage area network), Microsoft Access™ MySQL, PostgreSQL, HSpace, Apache Cassandra, MongoDB, Apache CouchDB™, or others may also be used, incorporated, or accessed. The database may reside in a single or multiple physical device(s) and in a single or multiple physical location(s). The database may store a plurality of types of data and/or files and associated data or file description, administrative information, or any other data.

Figure 2:
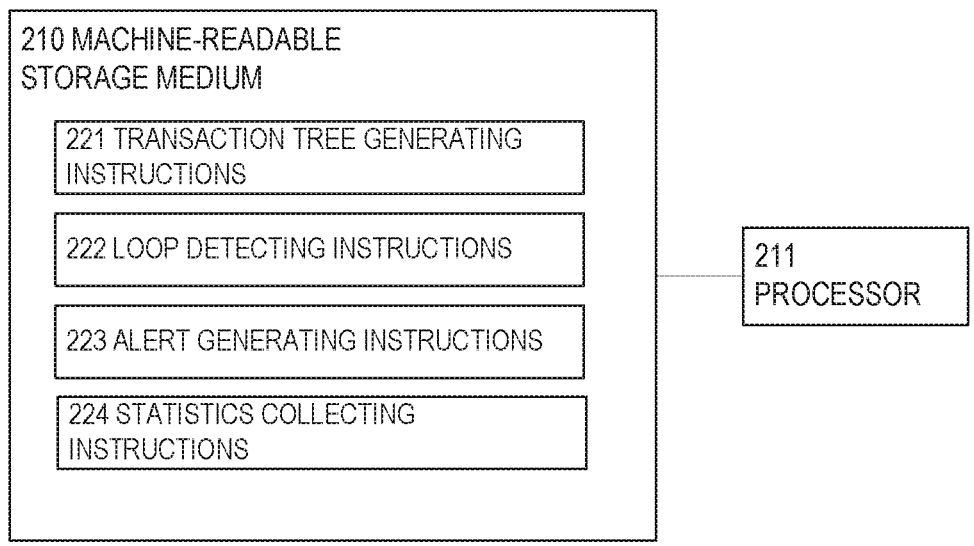
FIG. 2 is a block diagram depicting an example machine-readable storage medium comprising instructions executable by a processor for generating a transaction tree that organizes a set of transactions originated from a user request, detecting an abnormality based on a number of nodes and a depth level of a leaf node in the tree, and generating an alert based on the detected abnormality.

FIG. 2 is a block diagram depicting an example machine-readable storage medium 210 comprising instructions executable by a processor for generating a transaction tree that organizes a set of transactions originated from a user request, detecting an abnormality based on a number of nodes and a depth level of a leaf node in the tree, and generating an alert based on the detected abnormality.

In the foregoing discussion, engines 121-124 were described as combinations of hardware and programming. Engines 121-124 may be implemented in a number of fashions. Referring to FIG. 2, the programming may be processor executable instructions 221-224 stored on a machine-readable storage medium 210 and the hardware may include a processor 211 for executing those instructions. Thus, machine-readable storage medium 210 can be said to store program instructions or code that when executed by processor 211 implements transaction loop detecting system 110 of FIG. 1.

Machine-readable storage medium 210 may be any electronic, magnetic, optical, or other physical storage device that contains or stores executable instructions. In some implementations, machine-readable storage medium 210 may be a non-transitory storage medium, where the term "non-transitory" does not encompass transitory propagating signals. Machine-readable storage medium 210 may be implemented in a single device or distributed across devices. Likewise, processor 211 may represent any number of processors capable of executing instructions stored by machine-readable storage medium 210. Processor 211 may be integrated in a single device or distributed across devices. Further, machine-readable storage medium 210 may be fully or partially integrated in the same device as processor 211, or it may be separate but accessible to that device and processor 211.

In one example, the program instructions may be part of an installation package that when installed can be executed by processor 211 to implement transaction loop detecting system 110. In this case, machine-readable storage medium 210 may be a portable medium such as a floppy disk, CD, DVD, or flash drive or a memory maintained by a server from which the installation package can be downloaded and installed. In another example, the program instructions may be part of an application or applications already installed.

Here, machine-readable storage medium 210 may include a hard disk, optical disk, tapes, solid state drives, RAM, ROM, EEPROM, or the like.

Processor 211 may be at least one central processing unit (CPU), microprocessor, and/or other hardware device suitable for retrieval and execution of instructions stored in machine-readable storage medium 210. Processor 211 may fetch, decode, and execute program instructions 221-224, and/or other instructions. As an alternative or in addition to retrieving and executing instructions, processor 211 may include at least one electronic circuit comprising a number of electronic components for performing the functionality of at least one of instructions 221-224, and/or other instructions.

In FIG. 2, the executable program instructions in machine-readable storage medium 210 are depicted as transaction tree generating instructions 221, loop detecting instructions 222, alert generating instructions 223, and statistics collecting instructions 224. Instructions 221-224 represent program instructions that, when executed, cause processor 211 to implement engines 121-124, respectively.

Figure 3:
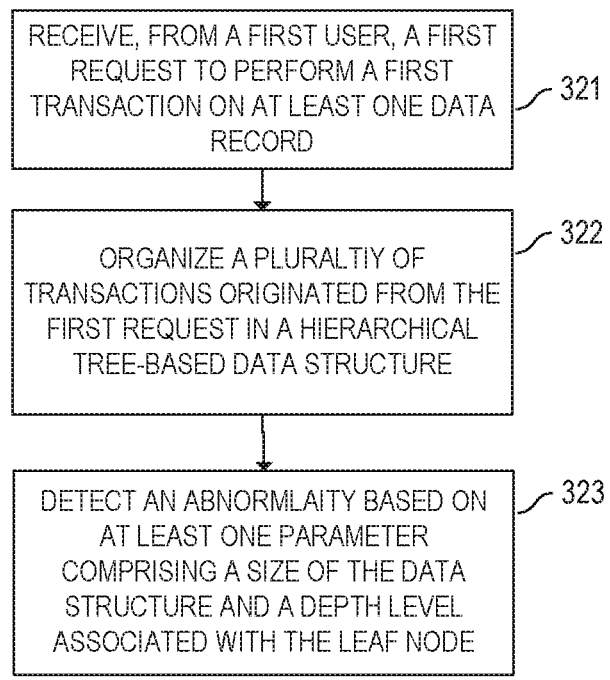
FIG. 3 is a flow diagram depicting an example method for detecting an abnormality using a hierarchical tree-based data structure.

FIG. 3 is a flow diagram depicting an example method 300 for detecting an abnormality using a hierarchical tree-based data structure. The various processing blocks and/or data flows depicted in FIG. 3 (and in the other drawing figures such as FIGS. 4-6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 300 as illustrated (and described in greater detail below) is meant be an example and, as such, should not be viewed as limiting. Method 300 may be implemented in the form of executable instructions stored on a machine-readable storage medium, such as storage medium 210, and/or in the form of electronic circuitry.

Method 300 may start in block 321 where a first request to perform a first transaction on at least one data record is received from a first user. The first transaction may be a root transaction. The root transaction either directly or indirectly calls all other transactions in a tree. In block 322, a plurality of transactions originated from the first request may be organized in a hierarchical tree-based data structure. The first transaction may be stored as a root node in the data structure. A second transaction, that is the latest transaction to be added to the data structure, may be stored as a leaf node in the data structure. The plurality of transactions in the same data structure may be associated with the same identifier or identifying information. The identifier may uniquely identify the first request.

In block 323, for each new (or latest) transaction being added to the data structure such as the second transaction, an abnormality may be detected based on at least one parameter including a size of the data structure and a depth level associated with the leaf node representing the second transaction. For example, the size of the data structure (e.g., a number of nodes in the data structure) may be compared against a predetermined size threshold and/or the depth level of the leaf node may be compared against a predetermined depth threshold to determine whether the abnormality has occurred.

Referring back to FIG. 1, hierarchical data tree engine 121 may be responsible for implementing blocks 321 and 322. Loop detecting engine 122 may be responsible for implementing block 323.

Figure 4:
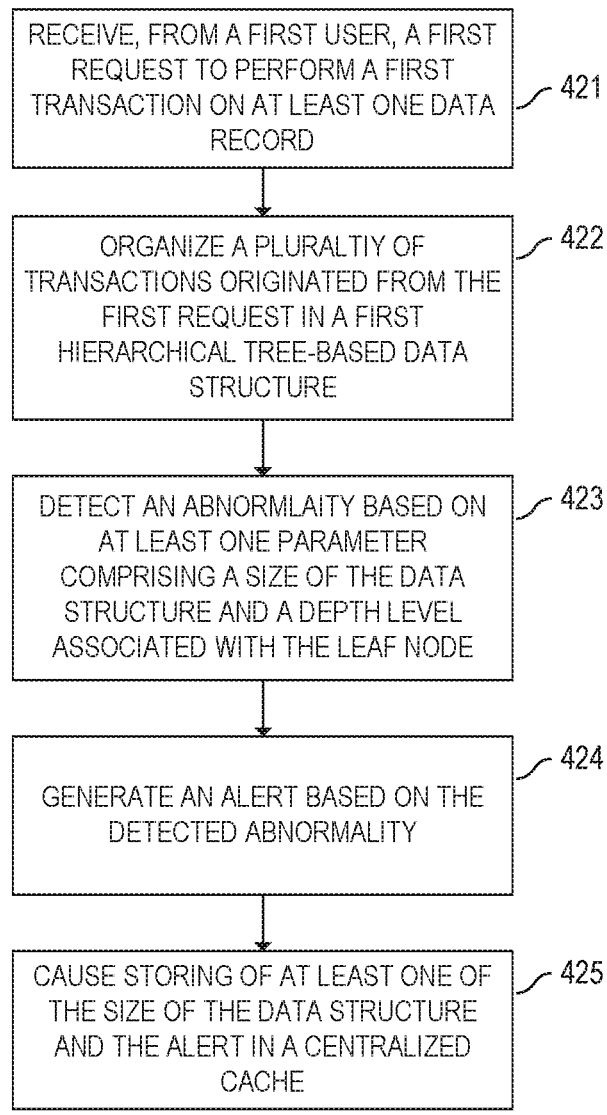
FIG. 4 is a flow diagram depicting an example method for detecting an abnormality using a hierarchical tree-based data structure and generating an alert based on the detected abnormality.

FIG. 4 is a flow diagram depicting an example method 400 for detecting an abnormality using a hierarchical tree-based data structure and generating an alert based on the detected abnormality. Method 400 as illustrated (and described in greater detail below) is meant be an example and, as such, should not be viewed as limiting. Method 400 may be implemented in the form of executable instructions stored on a machine-readable storage medium, such as storage medium 210, and/or in the form of electronic circuitry.

Method 400 may start in block 421 where a first request to perform a first transaction on at least one data record is received from a first user. The first transaction may be a root transaction. The root transaction either directly or indirectly calls all other transactions in a tree. In block 422, a plurality of transactions originated from the first request may be organized in a hierarchical tree-based data structure. The first transaction may be stored as a root node in the data structure. A second transaction, that is the latest transaction to be added to the data structure, may be stored as a leaf node in the data structure.

In block 423, for each new (or latest) transaction being added to the data structure such as the second transaction, an abnormality may be detected based on at least one parameter including a size of the data structure and a depth level associated with the leaf node representing the second transaction. For example, the size of the data structure (e.g., a number of nodes in the data structure) may be compared against a predetermined size threshold and/or the depth level of the leaf node may be compared against a predetermined depth threshold to determine whether the abnormality has occurred.

In block 424, method 400 may include generating an alert based on the detected abnormality. In some implementations, the alert may include root cause information related to the detected abnormality. The root cause information may include information related to the first or root transaction and/or the first request to perform the first transaction. For example, the root cause information may indicate when the request/transaction was made, which operations have been made by the request/transaction, which data record(s) have been affected by the request/transaction, etc.

In block 425, the root cause information from block 424 may be stored and/or logged in data storage 129 (e.g., centralized data storage as discussed above). Moreover, the size of the data structure as it grows may be tracked and/or stored in data storage 129.

Referring back to FIG. 1, hierarchical data tree engine 121 may be responsible for implementing blocks 421 and 422. Loop detecting engine 122 may be responsible for implementing block 423. Alert generating engine 123 may be responsible for implementing block 424. Hierarchical data tree engine 121 and loop detecting engine 122 may be responsible for implementing block 425.

Figure 5:
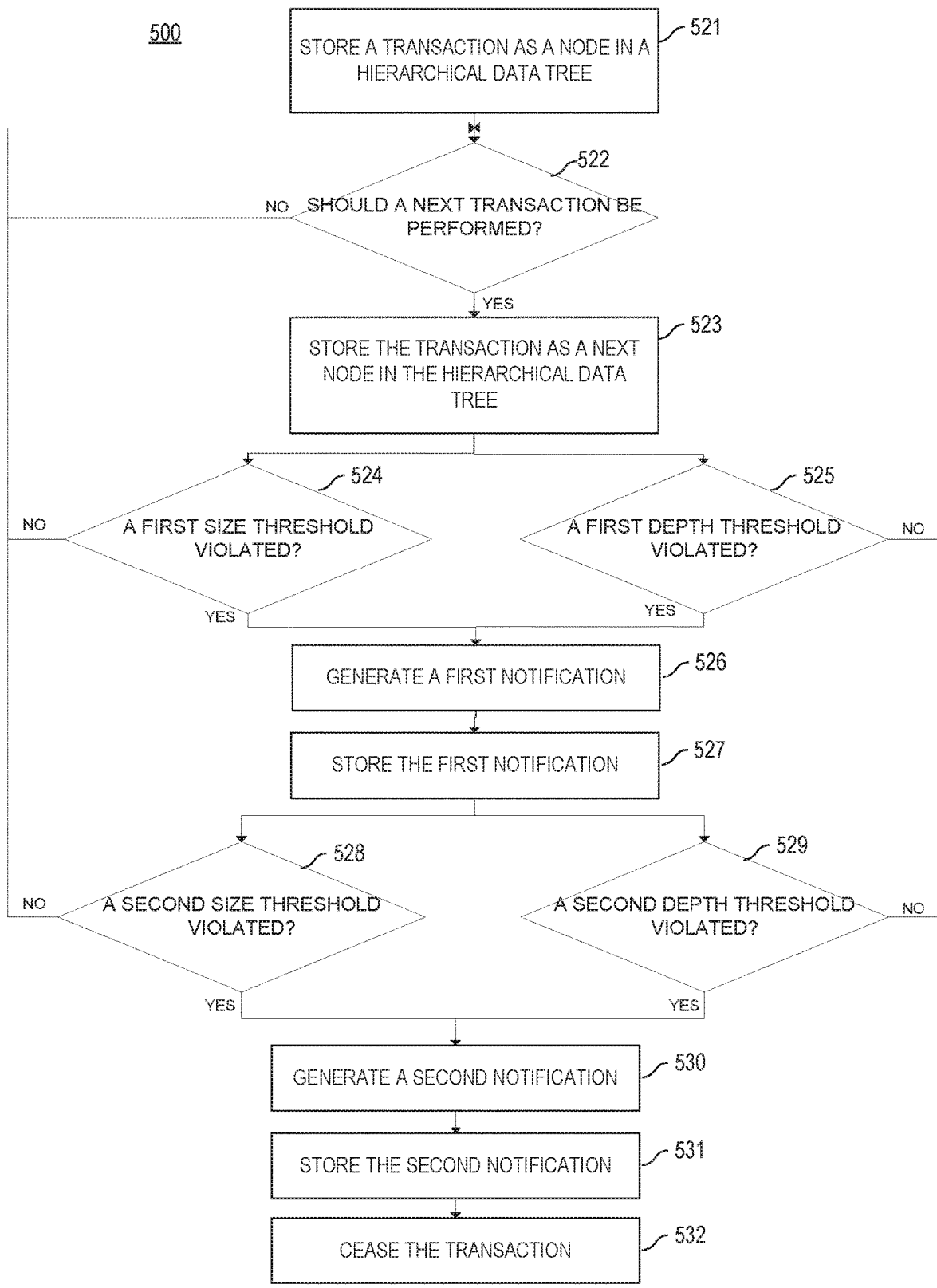
FIG. 5 is a flow diagram depicting an example method for detecting an abnormality using a hierarchical data tree and generating different levels of notifications based on the detected abnormality.

FIG. 5 is a flow diagram depicting an example method 500 for detecting an abnormality using a hierarchical data tree and generating different levels of notifications based on the detected abnormality. Method 500 as illustrated (and described in greater detail below) is meant be an example and, as such, should not be viewed as limiting. Method 500 may be implemented in the form of executable instructions stored on a machine-readable storage medium, such as storage medium 210, and/or in the form of electronic circuitry.

Method 500 may start in block 521 where a transaction may be stored as a node in a hierarchical data tree. This transaction may be a root transaction triggered based on a request to perform the root transaction on a data record or a subsequent transaction originated from that request. In block 522, method 500 may determine whether a next transaction should be performed. This determination may be made based on whether the performance of the previous transaction that has been performed on a first data record requires another transaction to be performed on another data record that is related to or affected by the first data record. In response to determining that a next transaction is required, the next transaction may be stored as a next node in the hierarchical data tree (block 523). The next node may be placed below the previous node and therefore have a depth level that is deeper than the depth level of the previous node.

In block 524, method 500 may include determining whether a first size threshold is violated by comparing a size of the data tree against the first size threshold. Similarly, in block 525, a depth level of the next node may be compared against a first depth threshold. If it is determined that the first size threshold has been violated and/or the first depth threshold has been violated, method 500 may proceed to block 526 where a first notification (e.g., warning notification) is generated. In block 527, the first notification may be stored and/or logged in data storage 129.

In block 528, method 500 may include determining whether a second size threshold is violated by comparing the size of the data tree against the second size threshold. Similarly, in block 529, the depth level of the next node may be compared against a second depth threshold. If it is determined that the second size threshold has been violated and/or the second depth threshold has been violated, method 500 may proceed to block 530 where a second notification (e.g., error notification) is generated. In block 531, the second notification may be stored and/or logged in data storage 129. In addition, method 500 may include causing the transaction to be ceased to end a potentially abnormal loop of transactions (block 532).

Referring back to FIG. 1, hierarchical data tree engine 121 may be responsible for implementing blocks 521, 522, and 523. Loop detecting engine 122 may be responsible for implementing blocks 524, 525, 528, and 529. Alert generating engine 123 may be responsible for implementing blocks 526, 527, 530, 531, and 532.

Figure 6:
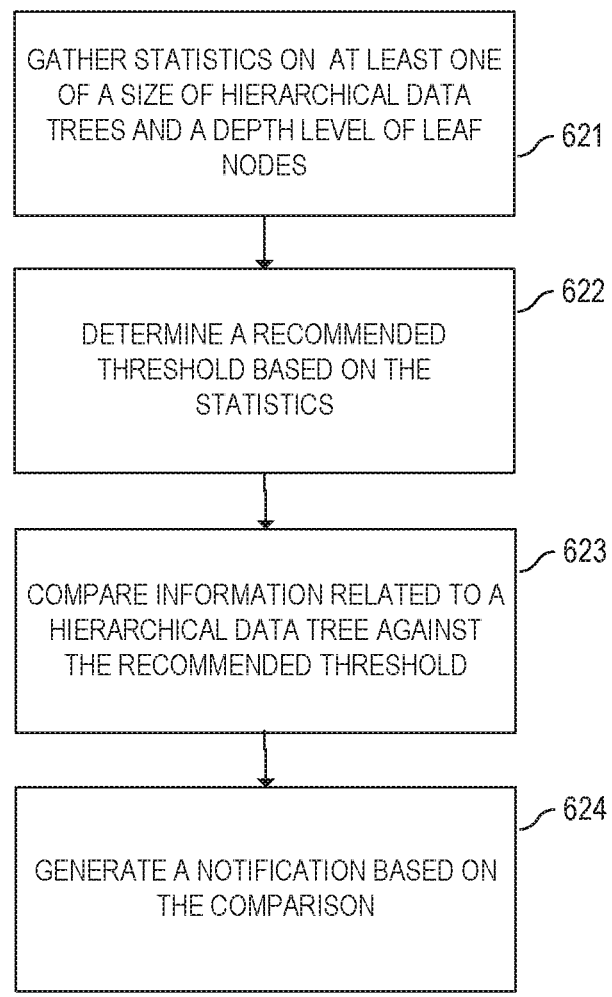
FIG. 6 is a flow diagram depicting an example method for gathering statistics on information related to hierarchical data trees.

FIG. 6 is a flow diagram depicting an example method 600 for gathering statistics on information related to hierarchical data trees. Method 600 as illustrated (and described in greater detail below) is meant be an example and, as such, should not be viewed as limiting. Method 600 may be implemented in the form of executable instructions stored on a machine-readable storage medium, such as storage medium 210, and/or in the form of electronic circuitry.

Method 600 may start in block 621 where statistics on at least one of a size of hierarchical data trees and a depth level of leaf nodes may be gathered. In one example, the statistics may be gathered on the average size of data trees. In this example, when there are 10 different data trees built based on 10 different requests. In this case, the average size of those 10 data trees may be gathered. In another example, the depth level of the deepest leaf node of individual data trees may be gathered. In some instances, the average depth level may be calculated and/or stored.

In block 622, a recommended threshold (e.g., a predetermined size threshold, a predetermined depth threshold, etc.) may be determined based on the statistics gathered in block 621. In block 623, the recommended size or depth threshold may be compared to the size or depth information of a particular data tree to detect an abnormal transaction loop. In block 624, a notification (including root cause information) may be generated based on this comparison. For example, if the size of the particular data tree exceeds the recommended size threshold, the notification may be generated.

Referring back to FIG. 1, statistics gathering engine 124 may be responsible for implementing blocks 621 and 622. Loop detecting engine 122 may be responsible for implementing block 623. Alert generating engine 123 may be responsible for implementing block 624.

FIG. 7 is a diagram depicting an example hierarchical data tree 700 for organizing a plurality of transactions originated from a request to perform a root transaction.

Hierarchical data tree 700 may organize a plurality of transactions originated from a single request in a tree-based data structure having multiple depth levels. Hierarchical data tree 700 may comprise a root node 710, internal nodes 721, 722, and/or leaf nodes 731-733. The root node is the top-most node from which the tree 700 starts. An internal node indicates that the node has sub-nodes (e.g., children nodes). A leaf node refers to a node with no sub-nodes. Each node in the tree 700 may represent a data structure comprising a corresponding transaction. A first or initial transaction to be initiated based on the request may be referred to herein as the "root" transaction. The root transaction either directly or indirectly calls all other transactions in the tree 700. The root transaction may be stored as root node 710 in hierarchical data tree 700. Root node 710 may be associated with the depth level "N."

The root transaction may call more than one transaction to be performed on its related entities. For example, there may be several nodes at the depth level "N+1" of the hierarchical tree 700. In this example depicted in FIG. 7, two separate transactions have been triggered based on the root transaction. Those two transactions may be stored as leaf node 721 and leaf node 722 at the depth level "N+1," For each of the new leaf nodes (e.g., nodes 721 and 722) added to hierarchical data tree 700, it may be determined whether an abnormality is detected by comparing the size of the tree 700 (e.g., the total number of nodes in the tree 700 including the new leaf node that has been added) against a predetermined size threshold and/or by comparing the depth level of the leaf node (e.g., depth level "N+1") against a predetermined depth threshold.

Further, the transaction corresponding to node 721 may require another transaction to be performed on its related data entity. In this example, a transaction corresponding to node 731 may be initiated and/or stored as leaf node 731 at the depth level "N+2." Once node 721 is linked to a child node such as node 731, node 721 may be considered as an internal node. Similarly, the transaction corresponding to node 722 may call two transactions (e.g., nodes 732 and 733). For each of the new leaf nodes (e.g., nodes 731, 732, and 733) added to the tree 700, it may be determined whether an abnormality is detected by comparing the size of the tree 700 (e.g., the total number of nodes in the tree 700 including the new leaf node that has been added) against a predetermined size threshold and/or by comparing the depth level of the leaf node (e.g., depth level "N+2") against a predetermined depth threshold. Once node 722 is linked to a child node such as nodes 732 and 733, node 722 may be also considered as an internal node. Note that additional transactions that originated from the same request may be added to the tree 700, and the size and depth of the tree 700 may continuously grow until an abnormal transaction loop is detected based on predetermined thresholds. Based on the detected loop, an alert and/or notification may be generated and/or stored in data storage 129. In some instances, the performance of a particular transaction that violated at least one predetermined threshold may be ceased to end a potentially abnormal loop of transactions.

The foregoing disclosure describes a number of example implementations for detection of abnormal transaction loops. The disclosed examples may include systems, devices, computer-readable storage media, and methods for detection of abnormal transaction loops. For purposes of explanation, certain examples are described with reference to the components illustrated in FIGS. 1-2. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 3-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method performed by a computing device for detecting an abnormality, the method comprising:
   receiving, from a first user, a first request to perform a first transaction on at least one data record;
   organizing a plurality of transactions originated from the first request in a first hierarchical tree-based data structure having multiple depth levels, the first hierarchical tree-based data structure comprising a root node representing the first transaction and a leaf node representing a second transaction of the plurality of transactions;
   comparing a depth level of the leaf node in the first hierarchical tree-based data structure to a depth threshold; and
   detecting an abnormality in the plurality of transactions in a system based on a result of comparing the depth level to the depth threshold, wherein the result indicates that the depth level of the leaf node exceeds the depth threshold.

2. The method of claim 1, further comprising:
   receiving, from a second user, a second request to perform the first transaction on the at least one data record; and
   organizing a plurality of transactions originated from the second request in a second hierarchical tree-based data structure.

3. The method of claim 2, wherein the plurality of transactions in the first hierarchical tree-based data structure are associated with a first identifier that uniquely identifies the first request, and wherein the plurality of transactions in the second hierarchical tree-based data structure are associated with a second identifier that uniquely identifies the second request.

4. The method of claim 1, further comprising:
identifying a time of the first request and data records affected by the first request; and
generating an alert based on the detected abnormality, wherein the alert includes root cause information related to the detected abnormality, the root cause information comprising the time of the first request and information identifying the data records affected by the first request.

5. A non-transitory machine-readable storage medium comprising instructions that upon execution cause a computing device to:
generate, in response to a first user request, a first transaction tree that organizes a first set of transactions originated from the first user request in a hierarchical data structure, wherein the first transaction tree comprises a first set of nodes including a root node representing an initial transaction executed based on the first user request and a leaf node representing a latest transaction of the first set of transactions, wherein the root node and the leaf node are at different depth levels in the first transaction tree;
compare a depth level of the leaf node in the first transaction tree to a depth threshold;
detect an abnormality in the first set of transactions in a system based on a result of comparing the depth level to the depth threshold, wherein the result indicates that the depth level of the leaf node in the first transaction tree exceeds the depth threshold; and
generate an alert based on the detected abnormality, wherein the alert includes information related to the first user request.

6. The non-transitory machine-readable storage medium of claim 5, wherein the instructions upon execution cause the computing device to:
generate a second transaction tree that organizes a second set of transactions originated from a second user request in a hierarchical data structure, wherein the second transaction tree comprises a second set of nodes including a root node representing an initial transaction executed based on the second user request and a leaf node representing a latest transaction of the second set of transactions; and
detect the abnormality based on a depth level of the leaf node in the second transaction tree.

7. The non-transitory machine-readable storage medium of claim 5, wherein the instructions upon execution cause the computing device to:
cause an execution of the latest transaction to be ceased based on the alert.

8. The non-transitory machine-readable storage medium of claim 5, wherein the first set of transactions comprises at least one of insert, update, or delete operations on a database record.

9. A system comprising:
a processor; and
a non-transitory storage medium storing instructions executable on the processor to:
cause storing of a representation of a first transaction as a first node in a hierarchical data tree, wherein the first transaction is performed on a first data entity;
determine whether the performance of the first transaction requires a second transaction to be performed on a second data entity that is related to the first data entity;
in response to determining that the performance of the first transaction requires the second transaction to be performed on the second data entity, cause storing of a representation of the second transaction as a second node in the hierarchical data tree, wherein the second node has a depth level that is deeper than a depth level of the first node;
compare the depth level of the second node to a depth threshold; and
detect an abnormal transaction loop in a plurality of transactions in a computing system in response to the depth level of the second node exceeding the depth threshold, the plurality of transactions comprising the first transaction and the second transaction.

10. The system of claim 9, wherein the instructions are executable on the processor is to:
determine whether the performance of the second transaction requires a third transaction to be performed on a third data entity that is related to the second data entity;
in response to determining that the performance of the second transaction requires the third transaction to be performed on the third data entity, cause storing of a representation of the third transaction as a third node in the hierarchical data tree, wherein the third node has a depth level that is deeper than the depth level of the second node; and
detect the abnormal transaction loop in response to the depth level of the third node exceeding the depth threshold.

11. The system of claim 9, wherein a size of the hierarchical data tree comprises a number of nodes in the hierarchical data tree, and wherein detecting the abnormal transaction loop further comprises:
comparing the number of nodes to a size threshold; and
detecting that the number of nodes exceeds the size threshold.

12. The method of claim 1, wherein the second transaction is called directly or indirectly by the first transaction.

13. The method of claim 12, further comprising:
determining that the first transaction performed on a first data record requires the second transaction performed on a second data record related to or affected by the first data record.

14. The method of claim 1, further comprising:
collecting statistics relating to depth levels of a plurality of hierarchical tree-based data structures for different requests; and
computing the depth threshold based on the statistics.

15. The method of claim 1, wherein detecting the abnormality in the plurality of transactions in the system is further based on detecting that a number of nodes of the first hierarchical tree-based data structure exceeds a size threshold.

16. The non-transitory machine-readable storage medium of claim 5, wherein the instructions upon execution cause the computing device to:
collect statistics relating to depth levels of a plurality of transaction trees for different requests; and
compute the depth threshold based on the statistics.

17. The non-transitory machine-readable storage medium of claim 5, wherein detecting the abnormality is further based on a number of nodes of the first transaction tree exceeding a size threshold.

18. The system of claim 9, wherein the instructions are executable on the processor to:
   collect statistics relating to depth levels of a plurality of hierarchical data trees for different requests; and
   compute the depth threshold based on the statistics.

19. The system of claim 18, wherein the instructions are executable on the processor to:
   collect statistics relating to sizes of the plurality of hierarchical data trees for different requests, wherein each respective size of the sizes comprises a number of nodes of a respective hierarchical data tree of the plurality of hierarchical data trees; and
   compute a size threshold based on the statistics relating to the sizes of the plurality of hierarchical data trees,
   wherein detecting the abnormal transaction loop is further based on detecting that a number of nodes of the respective hierarchical data tree of the plurality of hierarchical data trees exceeds the size threshold.

20. The non-transitory machine-readable storage medium of claim 5, wherein the detecting comprises detecting an abnormal transaction loop in the first set of transactions.

\* \* \* \* \*